(12) United States Patent
Fan et al.

(10) Patent No.: US 9,057,900 B2
(45) Date of Patent: Jun. 16, 2015

(54) DISPLAY MODULE

(75) Inventors: Chih-Shun Fan, Hsin-Chu (TW);
Meng-Cheng Chu, Hsin-Chu (TW); Su Lo, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 192 days.

(21) Appl. No.: 13/590,280

(22) Filed: Aug. 21, 2012

(65) Prior Publication Data

US 2013/0300973 A1    Nov. 14, 2013

(30) Foreign Application Priority Data

May 10, 2012 (TW) .............................. 101116721 A

(51) Int. Cl.
*G02F 1/1333*    (2006.01)
*F21V 8/00*    (2006.01)

(52) U.S. Cl.
CPC ............ *G02F 1/133308* (2013.01); *G02F 2001/133317* (2013.01); *G02B 6/0088* (2013.01)

(58) Field of Classification Search
CPC ................................................ G02F 1/133308
USPC ............................................................ 349/58
See application file for complete search history.

(56) References Cited

U.S. PATENT DOCUMENTS

2012/0268685 A1*  10/2012  Nishimura ...................... 349/58

FOREIGN PATENT DOCUMENTS

| CN | 201259594 | 6/2009 |
|---|---|---|
| TW | 200722843 | 6/2007 |
| TW | M379080 | 4/2010 |

OTHER PUBLICATIONS

China Patent Office, "Office Action", May 30, 2014.

* cited by examiner

*Primary Examiner* — Phu Vu
(74) *Attorney, Agent, or Firm* — WPAT, PC; Justin King

(57) ABSTRACT

A display module, which includes a display panel, a backlight unit and a bezel. The backlight unit is disposed opposite to the display panel. The bezel includes a bottom, a plurality of sidewalls and a plurality of extension structures. The bottom is configured to support the backlight unit. These sidewalls are configured to corporately enclose the display panel and the backlight unit, and each sidewall has a first end and a second end opposite to each other; wherein the first end is connected to the bottom. The extension structures each extend from the second end of the respective sidewall and include a supporting portion, disposed between the backlight unit and the display panel and opposite to the bottom, configured to support the display panel.

12 Claims, 4 Drawing Sheets

DISPLAY MODULE

TECHNICAL FIELD

The disclosure relates to a display module, and more particularly to a display module having a bezel with a supporting portion.

BACKGROUND

With the booming development of thigh-tech electronic information industry, our daily lives have been impacted by consumer electronic products. Specifically, liquid crystal display apparatuses, due to having some advantages such as compact size, lighter weight and low radiation, have gradually became one of the mainstream display products in market.

FIG. 1 is a schematic cross-sectional view of a conventional liquid crystal display module. The conventional liquid crystal display module 1 basically includes a liquid crystal display panel 10, a backlight unit 11, a bezel 12 and a supporting frame 13; wherein the liquid crystal display panel 10 is disposed on the supporting frame 13 and fixed on the supporting frame 13 through a tape 14. The backlight unit 11 is disposed under the liquid crystal display panel 10 and configured to provide light sources to the liquid crystal display panel 10. The backlight unit 11 can be bonded or fixed to the supporting frame 13 through many various means; for example, as illustrated in FIG. 1, the backlight unit 11 is fixed to the supporting frame 13 through a tape 15. The bezel 12 has a bottom 121 and a plurality of sidewalls 122. The bottom 121 is configured to support the backlight unit 11; and the sidewalls 122 are configured to corporately enclose the liquid crystal display panel 10, the backlight unit 11 and the supporting frame 13.

According to the structure of the liquid crystal display module 1, the supporting frame 13 is an essential component for supporting the liquid crystal display panel 10 and positioning the backlight unit 11. However, the feature of supporting the liquid crystal display panel 10 is not so obvious due to the liquid crystal display module 1 today is getting smaller and lighter. For example, as illustrated in FIG. 1, the supporting frame 13 includes a supporting portion 131, which is configured to support the liquid crystal display panel 10. As mention above, because the liquid crystal display module 1 as well as the liquid crystal display panel 10 are getting thinner and lighter, it is an important issue to those ordinarily skilled in the art to develop another mean to support the liquid crystal display panel 10 instead of the supporting frame 13, due to the mold cost of the supporting frame 13 is high.

SUMMARY OF EMBODIMENTS

Therefore, one object of the present disclosure is to provide a display module with a bezel capable of supporting a display panel; thus, the display module can have lower cost due to no need of the supporting frame.

An embodiment of the present disclosure provides a display module, which includes a display panel, a backlight unit and a bezel. The backlight unit is disposed opposite to the display panel. The bezel includes a bottom, a plurality of sidewalls and a plurality of extension structures. The bottom is configured to support the backlight unit. These sidewalls are configured to corporately enclose the display panel and the backlight unit, and each sidewall has a first end and a second end opposite to each other; wherein the first end is connected to the bottom. The extension structures each extend from the second end of the respective sidewall and include a supporting portion, disposed between the backlight unit and the display panel and opposite to the bottom, configured to support the display panel.

In Summary, according to the display module disclosed in the present disclosure, the display panel can be supported by the supporting portions of the extension structures each extending from one end of the respective sidewall of the bezel. Thus, the display module according to the present disclosure can, compared with the conventional display module requiring a supporting frame for supporting the display panel, support the display panel directly by the bezel thereof without employing the supporting frame; and consequently the display module according to the present disclosure can have lower manufacturing cost.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
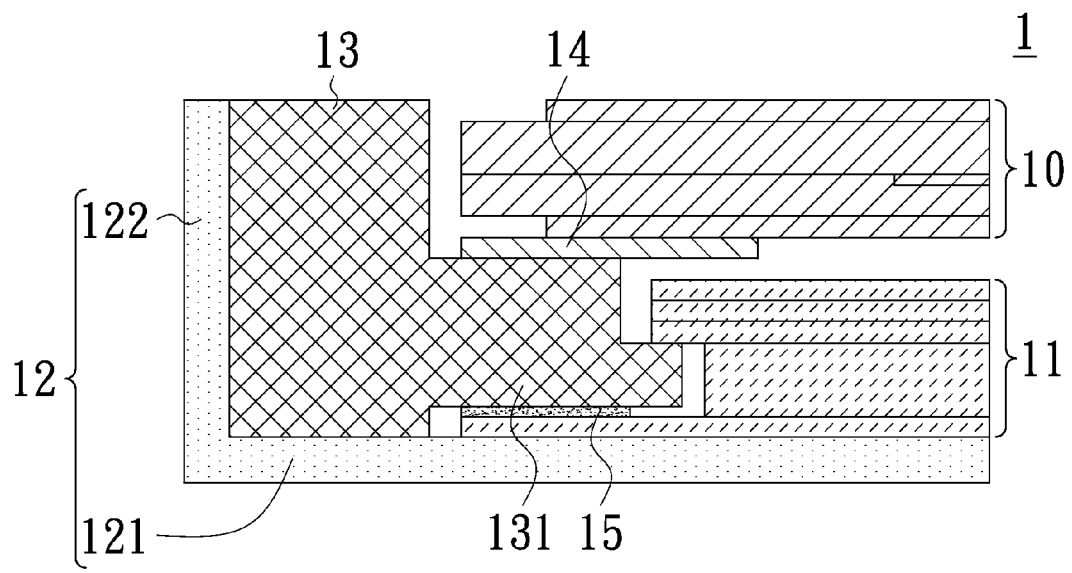
FIG. 1 is a schematic cross-sectional view of a conventional liquid crystal display module.
Figure 2:
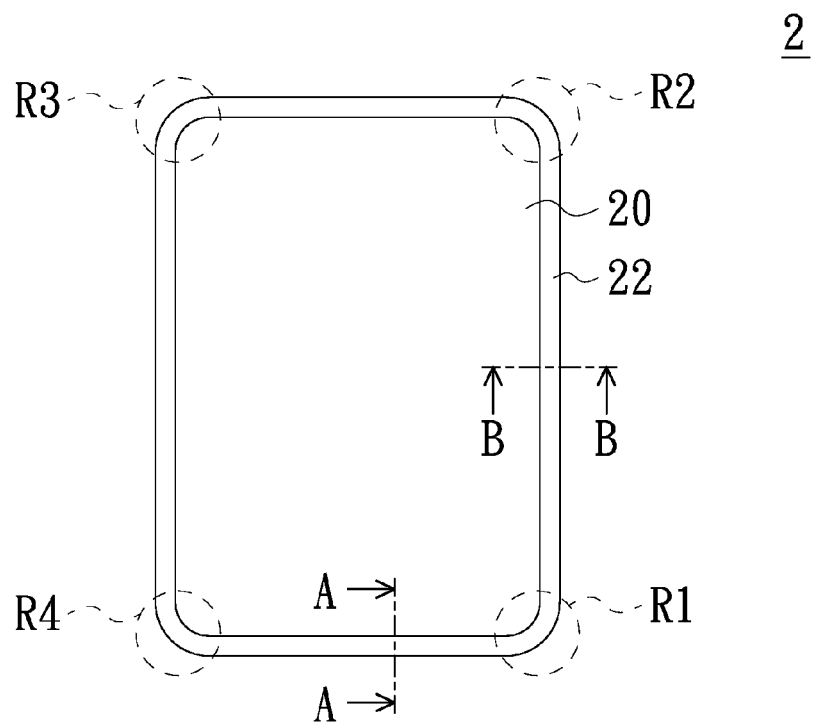
FIG. 2 is a schematic top view of a display module in accordance with an embodiment of the present disclosure.
Figure 3A:
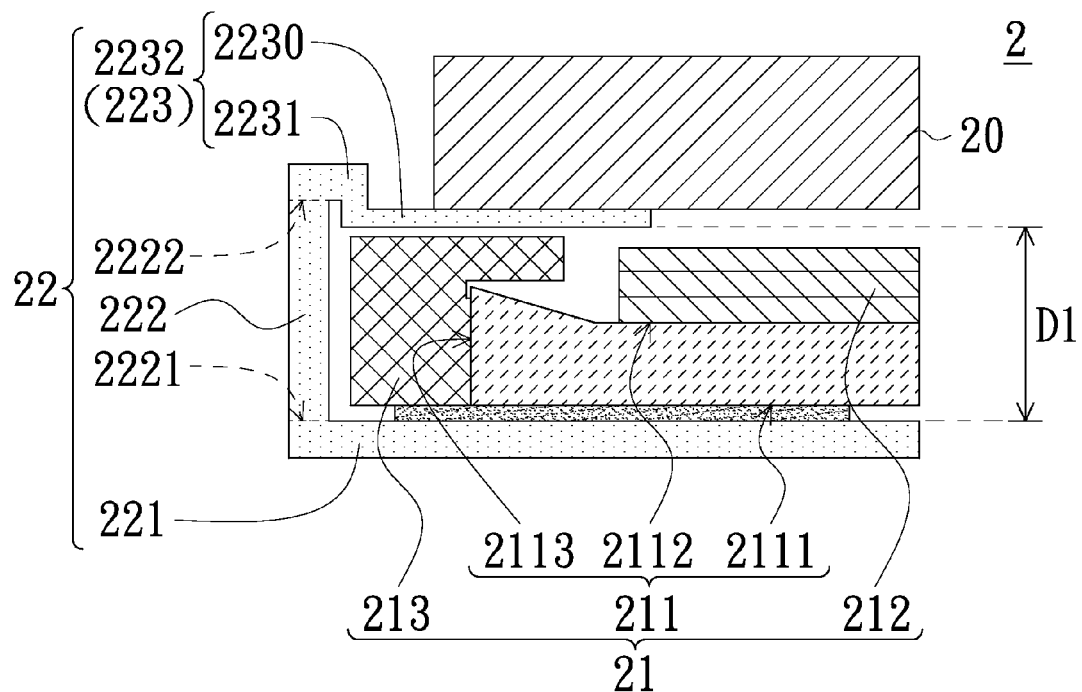
FIG. 3A is a schematic cross-sectional view of the display module, taken along the line A-A in FIG. 2.
Figure 3B:
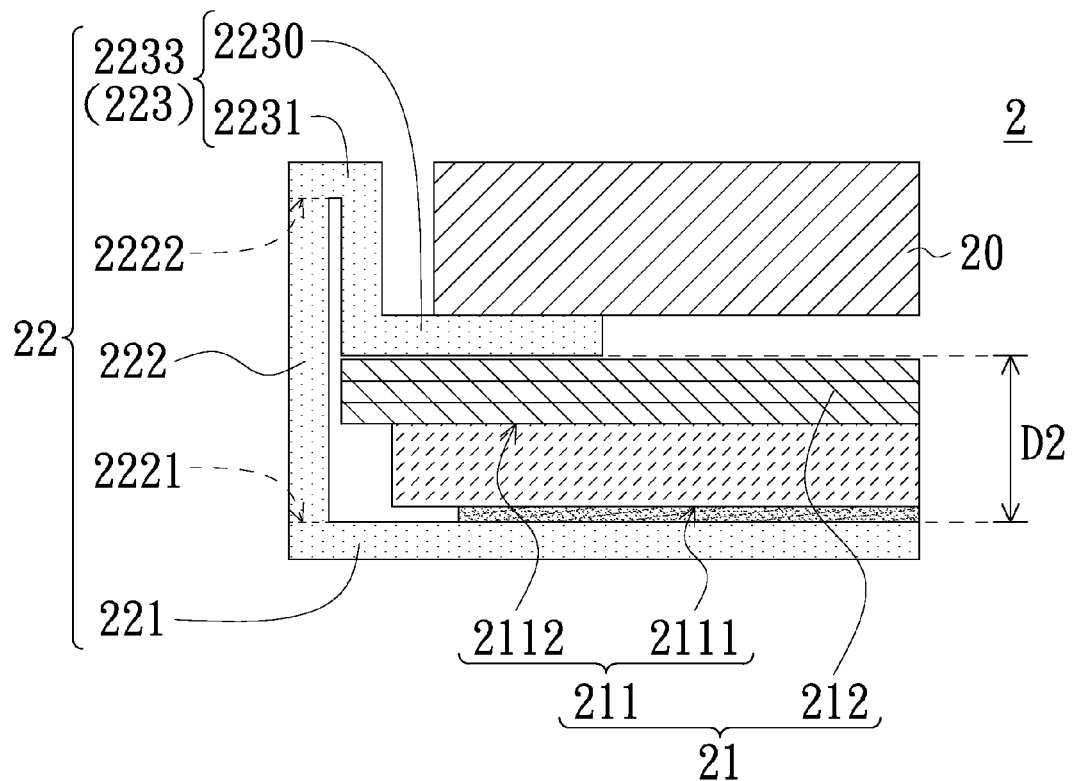
FIG. 3B is a schematic cross-sectional view of the display module, taken along the line B-B in FIG. 2.

FIG. 2 is a schematic top view of a display module in accordance with an embodiment of the present disclosure; FIG. 3A is a schematic cross-sectional view of the display module, taken along the line A-A in FIG. 2; and FIG. 3B is a schematic cross-sectional view of the display module, taken along the line B-B in FIG. 2. As shown, the display module 2 in this embodiment includes a display panel 20, a backlight unit 21 and a bezel 22; wherein the backlight unit 21 is disposed opposite to the display panel 20. The bezel 22 includes a bottom 221, a plurality of sidewalls 222 and a plurality of extension structures 223. The bottom 221 is configured to support the backlight unit 21. These sidewalls 222 are configured to corporately enclose the display panel 20 and the backlight unit 21, and each have a first end 2221 and a second end 2222 opposite to each other; wherein the first end 2221 is connected to the bottom 221. These extension structures 223 each extend from the second end 2222 of the respective sidewall 222 and include a supporting portion 2230. The supporting portion 2230, disposed between the backlight unit 21 and the display panel 20 and opposite to the bottom 221, is configured to support the display panel 20.

In this embodiment, these extension structures 223 each further include a connection portion 2231 connected between the respective sidewall 222 and supporting portion 2230. Specifically, the connection portion 2231 is perpendicular to the respective supporting portion 2230, and the connection portion 2231 and the respective supporting portion 2230 corporately have an L-shaped structure accordingly; and the present disclosure is not limited thereto. It is to be noted that the bezel 22 is made of stainless steel material, and the extension structure 223 can be bended to have the L-shaped structure, constituted by the connection portion 2231 and the supporting portion 2230, by a sheet metal working process; and the present disclosure is not limited thereto. However, it is understood that the material of the bezel 22 is not limited to the stainless steel; in other words, any material applicable for the sheet metal working process can be selected to use for the bezel 22. In addition, the supporting portion 2230 and the display panel 20 are bonded to each other by being coated with viscose (not shown) therebetween.

As shown in FIGS. 3A, 3B, the backlight unit 21 includes a light guide plate 211, an optical film 212 and a light source 213. The light guide plate 211 is disposed on the bottom 221 of the bezel 22 and has a bottom surface 2111, a light emission surface 2112 and a light incidence surface 2113; wherein the bottom surface 2111 and the light emission surface 2112 are opposite to each other, and the light incidence surface 2113 is connected between the bottom surface 2111 and the light emission surface 2112. The optical film 212 is disposed on the light emission surface 2112 of the light guide plate 211. The light source 213 is disposed next to the light incidence surface 2113 of the light guide plate 211. In this embodiment, the extension structure 223 is referred to either the first extension structure 2232 or the second extension structure 2233. Specifically, the supporting portion 2230 of the first extension structure 2232 is disposed above the light source 213 and a portion of the optical film 212 and configured to block the lights emitted from the light source 213 so as to prevent the light leakage from occulting in the display module 2. Moreover, to have a sufficient space for the arrangement of the light source 213, the supporting portion 2230 of the first extension structure 2232 and the bottom 221 of the bezel 22 are configured to have the shortest distance D1 therebetween greater than the shortest distance D2 between the supporting portion 2230 of the second extension structure 2233 and the bottom 221 of the bezel 22.

The display module 2 in this embodiment is exemplified by a single-side light emitting display module; and the present disclosure is not limited thereto. In other words, the structure of the bezel 22 disclosed in this embodiment can be also applied to the multi-side light emitting display module.

Figure 4:
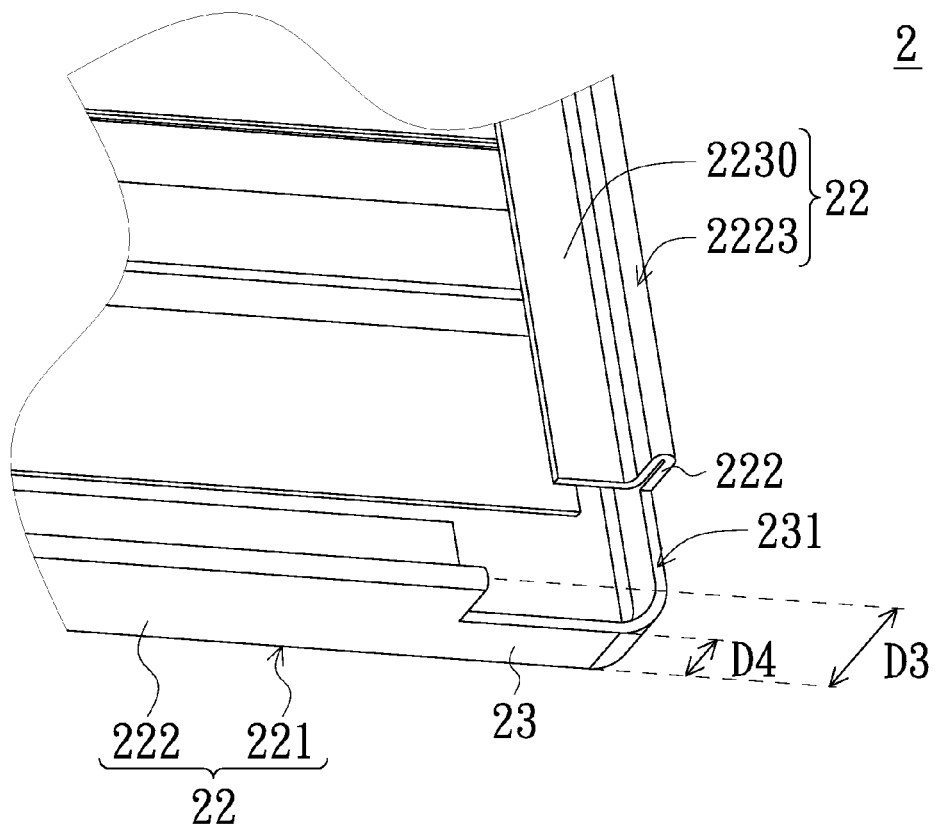
FIG. 4 is a schematic enlarged view of the display module, taken within the dotted line R1 in FIG. 2.
Figure 5:
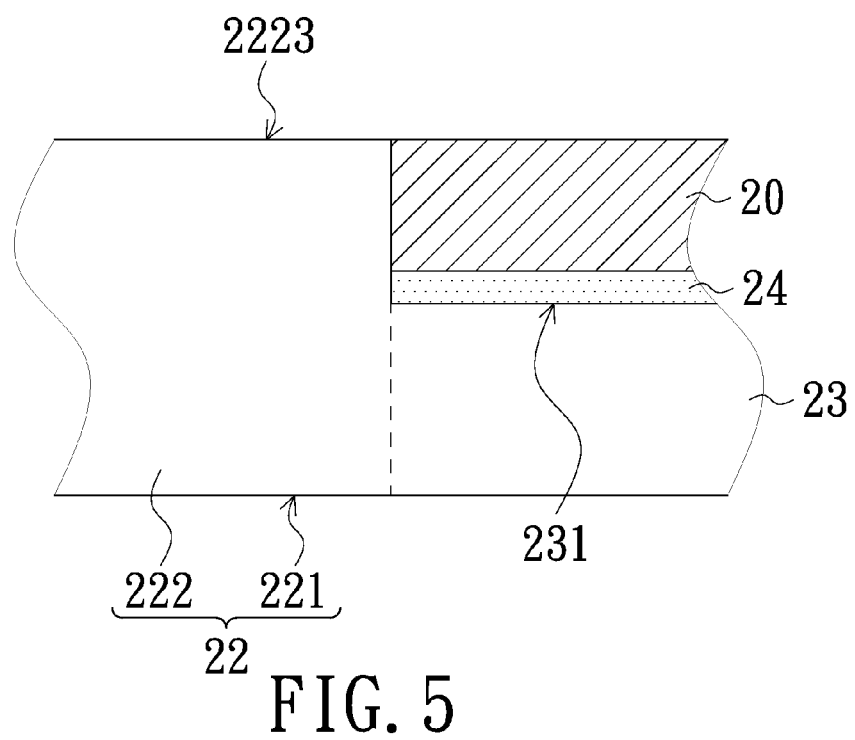
FIG. 5 is a schematic side view of a portion of the display module in FIG. 2.

FIG. 4 is a schematic enlarged view of the display module 2, taken within the dotted line R1 in FIG. 2; and FIG. 5 is a schematic side view of a portion of the display module 2 in FIG. 2. To get a clear illustration of the display module 2 in this embodiment, it is to be noted that the display panel 20 is not shown in FIG. 4. As shown in FIG. 4, the display module 2 in this embodiment further includes a bending connection structure 23, which is disposed in the corners of the bottom 221 of the bezel 22 (that is, the four corners R1, R2, R3 and R4 illustrated in FIG. FIG. 2) and configured to connect any two adjacent sidewalls 222. The bending connection structure 23 has a first top surface 231; the sidewalls 222 each have a second top surface 2223; and the second top surface 2223 and the bottom 221 of the bezel 22 are configured to have the shortest distance D3 therebetween greater than the shortest distance D4 between the first top surface 231 and the bottom 221 of the bezel 22. Moreover, because there is no any shielding structure (such as the supporting portion 2230 of the extension structures 223) arranged in the four corners R1, R2, R3 and R4 of the bottom 221 of the bezel 22, a shielding tape 24 is disposed between the bending connection structure 23 and the display panel 20 and configured to prevent the light leakage from occulting in the four corners R1, R2, R3 and R4, as shown in FIG. 5.

Figure 6A:
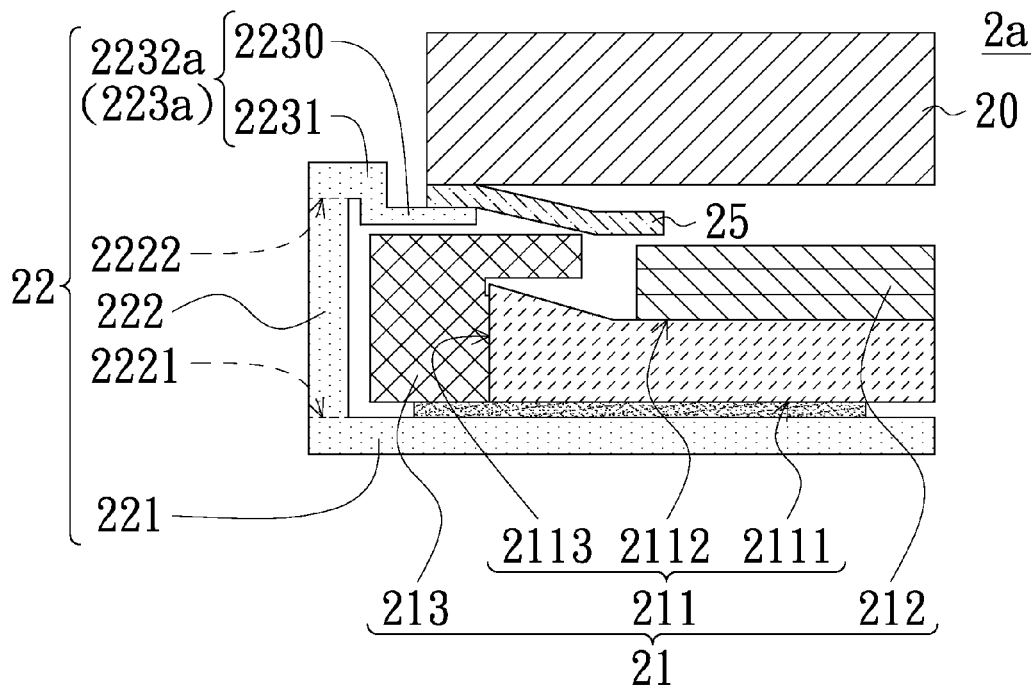
FIGS. 6A, 6B are schematic cross-sectional views of a display module in accordance with another embodiment of the present disclosure.
Figure 6B:
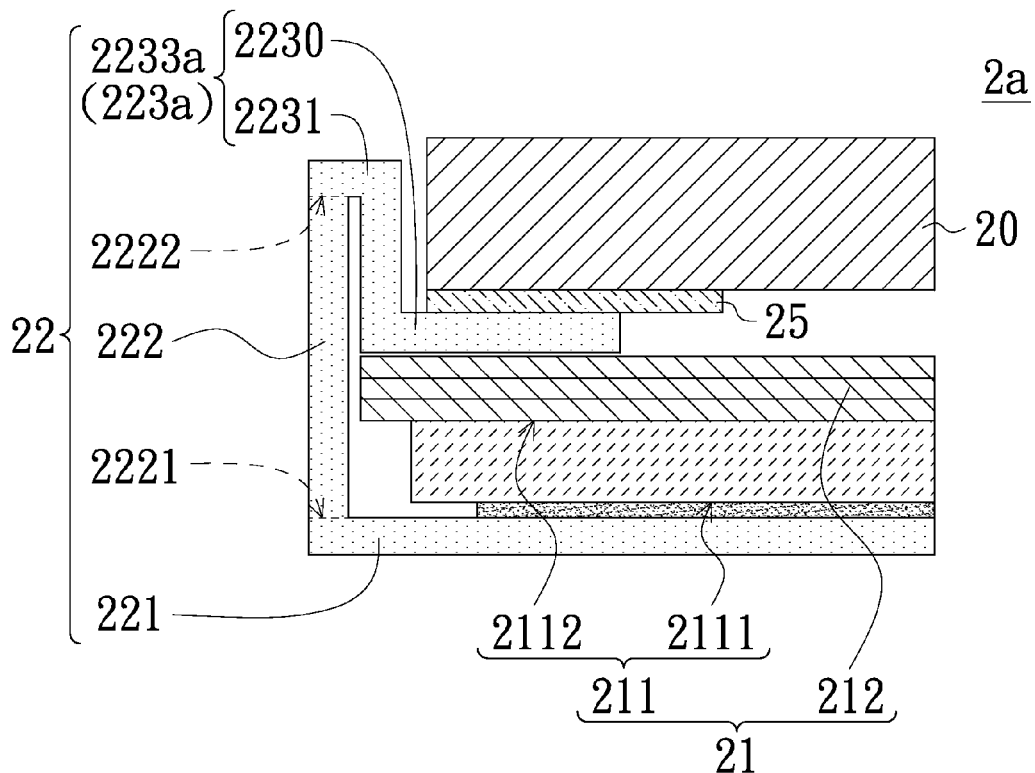

FIGS. 6A, 6B are schematic cross-sectional views of a display module in accordance with another embodiment of the present disclosure. As shown, the display module 2a in this embodiment has a structure similar to that of the display module 2 in FIGS. 3A, 3B; and the main different between the two is that display module 2a further includes a plurality of shielding tapes 25, which are disposed between the supporting portions 2230 of the extension structures 223a and the display panel 20 and configured to bond the two to each other. Specifically, as illustrated in FIG. 6A, the shielding tape 25, disposed between the first extension structure 2232a and the display panel 20 and above the light source 213 and a portion of the optical film 212, is further configured to block the lights emitted from the light source 213 so as to prevent the light leakage from occulting in the display module 2a.

In Summary, according to the display module disclosed in the present disclosure, the display panel can be supported by the supporting portions of the extension structures each extending from one end of the respective sidewall of the bezel. Thus, the display module according to the present disclosure can, compared with the conventional display module requiring a supporting frame for supporting the display panel, support the display panel directly by the bezel thereof without employing the supporting frame; and consequently the display module according to the present disclosure can have lower manufacturing cost.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display module, comprising:
   a display panel;
   a backlight unit disposed opposite to the display panel; and
   a bezel, comprising:
     a bottom configured to support the backlight unit, the bottom forming at least one corner;
     a plurality of sidewalls configured to corporately enclose the display panel and the backlight unit, and each sidewall having a first end and a second end opposite to each other, the first end being connected to the bottom; and
     a plurality of extension structures, each extension structure extending from the second end of the respective sidewall and comprising a supporting portion, disposed between the backlight unit and the display panel and opposite to the bottom, configured to support the display panel,
   wherein the backlight unit comprises a light guide plate and a light source, the light guide plate is disposed on the bottom of the bezel and has a bottom surface facing to the bottom of the bezel, a light emission surface and a light incidence surface, the bottom surface and the light emission surface are opposite to each other, the light incidence surface is connected between the bottom surface and the light emission surface, the light source is disposed next to the light incidence surface of the light guide plate, the extension structure is referred to either a first extension structure or a second extension structure, the supporting portion of the first extension structure and the bottom are configured to have the shortest distance therebetween greater than the shortest distance between the supporting portion of the second extension structure and the bottom, a extending direction of the first extension structure is vertical to a extending direction of the second extension structure, and the first extension structure is not connected to the second extension structure in the corner.

2. The display module according to claim 1, wherein each extension structure further comprises a connection portion connected between the respective sidewall and the respective supporting portion.

3. The display module according to claim 2, wherein the connection portion is perpendicular to the respective supporting portion, and the connection portion and the respective supporting portion corporately have an L-shaped structure accordingly, and the connection portion extending from a terminal of the respective sidewall is bended downward to be located adjacent to the respective sidewall.

4. The display module according to claim 2, wherein the backlight unit comprises:
   an optical film disposed on the light emission surface of the light guide plate
   wherein the supporting portion of at least one of the extension structure is disposed above the light source and a portion of the optical film.

5. The display module according to claim 4, further comprising:
   a plurality of shielding tapes disposed between the supporting portions of the extension structures and the display panel and configured to bond the display panel and the supporting portions to each other, wherein at least one of the shielding tapes is disposed above the light source and a portion of the optical film.

6. The display module according to claim 1, further comprising:
   a bending connection structure disposed in the corner of the bottom of the bezel and configured to connect associated two adjacent sidewalls, wherein a vertical height of the bending connection structure is less than a vertical height of each one of the two adjacent sidewalls.

7. The display module according to claim 6, wherein a shielding tape is disposed between the bending connection structure and the display panel.

8. The display module according to claim 6, wherein the bending connection structure has a first top surface, the sidewalls each have a second top surface, and the second top surface and the bottom of the bezel are configured to have the shortest distance therebetween greater than the shortest distance between the first top surface and the bottom of the bezel.

9. The display module according to claim 1, wherein the supporting portion of the first extension structure is not connected to the supporting portion of the second extension structure in the corner.

10. The display module according to claim 2, the connection portion of the first extension structure is not connected to the connection portion of the second extension structure in the corner.

11. The display module according to claim 4, wherein the first extension structure is disposed above the light source and a portion of the optical film.

12. The display module according to claim 1, wherein the light source has a protruding part disposed above a portion of the light guide plate and the first extension structure is disposed above the light source.

* * * * *